June 17, 1969  C. A. DAYTON  3,450,310
MEASURING AND DISPENSING DEVICE HAVING
A PLURALITY OF ROTARY TRAP CHAMBERS
Filed June 19, 1967  Sheet 1 of 2

INVENTOR.
CLEVELAND A. DAYTON
BY *Allen and Chromy*

ATTORNEYS

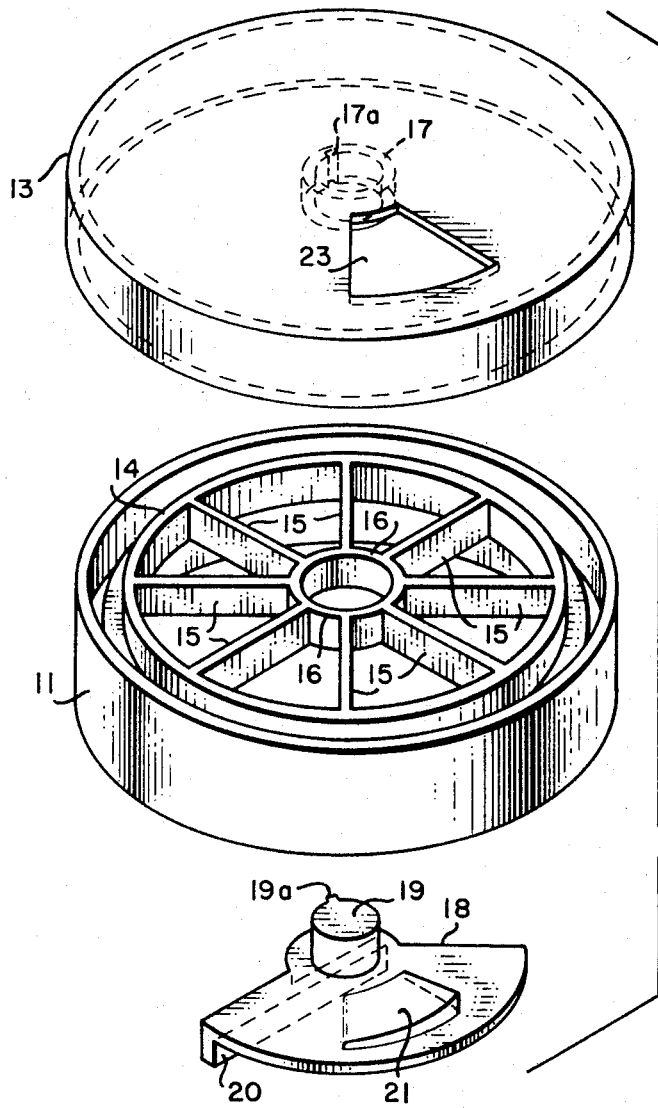
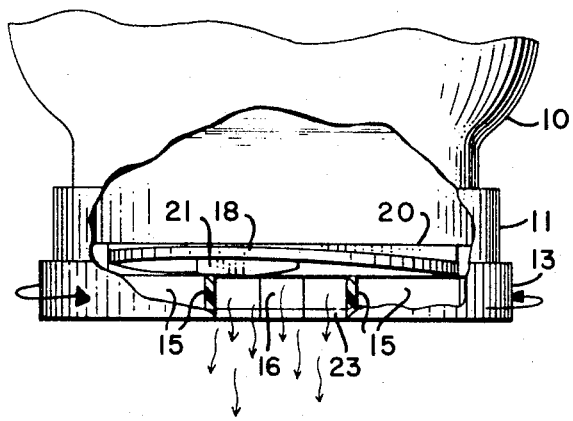
FIG. 3
FIG. 4
INVENTOR.
CLEVELAND A. DAYTON

United States Patent Office 3,450,310
Patented June 17, 1969

3,450,310
MEASURING AND DISPENSING DEVICE HAVING A PLURALITY OF ROTARY TRAP CHAMBERS
Cleveland A. Dayton, 16603 Marchmont Drive, Los Gatos, Calif. 95030
Filed June 19, 1967, Ser. No. 647,074
Int. Cl. G01f *11/20, 13/00*
U.S. Cl. 222—221                     2 Claims

ABSTRACT OF THE DISCLOSURE

A measuring and dispensing device which may be used in place of screw-type covers for jars and the like. The device is made up of three parts, one of which is provided with threads to engage the threads of the jar, and another of which is made of resilient material so that it may be deformed as the cover is rotated to provide snap action for ejecting material from compartments formed in the cover as the compartments are rotated in sequence past an opening formed in the cover.

Description of the invention

This invention relates to a measuring and dispensing device adapted to be used as a cover for containers of granular or pulverized material, particularly material that is wettable or water soluble.

An object of this invention is to provide an improved cover for containers of granular or pulverized material, said cover being adapted to dispense measured quantities of the material.

Another object of this material is to provide a measuring and dispensing cover for jars or the like which is adapted to be efficiently and economically manufactured from material such as plastic, metal or the like.

Another object of this invention is to provide an improved measuring and dispensing cover for jars or the like, said cover being provided with a snap action device for facilitating ejecting of granular or pulverized material from compartments formed in the cover as said compartments are brought into alignment with a dispensing opening.

Still another object of this invention is to provide an improved measuring and dispensing device which may be used in place of the screw-type covers for jars and the like, said device being made up of three parts, one of which is provided with threads to engage the threads of the jar, and another of which is made of resilient material so that it may be deformed as the cover is rotated to provide snap action for ejecting material from compartments formed in the cover as the compartments are rotated in sequence past an opening formed in the cover.

Other and further objects of this invention will be apparent to those skilled in the art to which it relates from the following specification, claims and drawing, in which, briefly:

FIG. 3 is an exploded view showing the parts of this device; and

FIG. 4 is a fragmentary view partially in section showing the snap action device of this invention used to facilitate ejecting measured quantities of material from the device.

Figure 1:
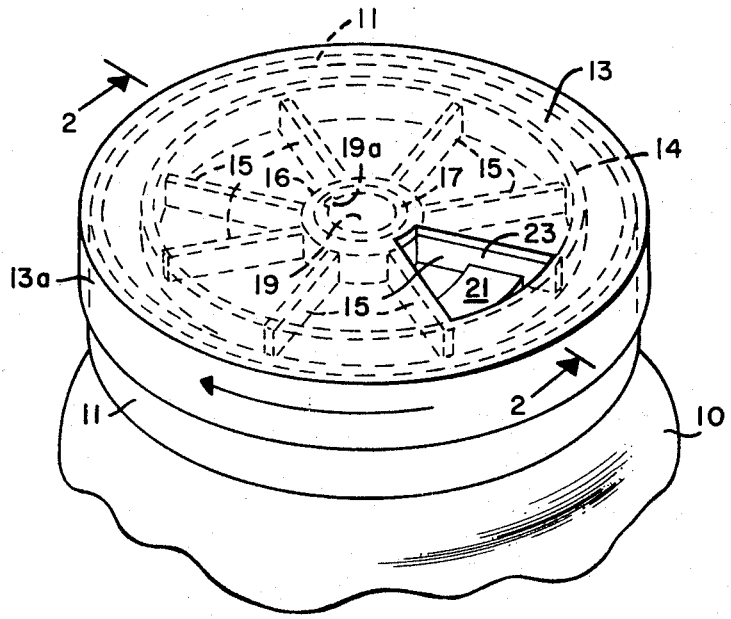
FIG. 1 is a perspective view of an embodiment of this invention.
Figure 2:
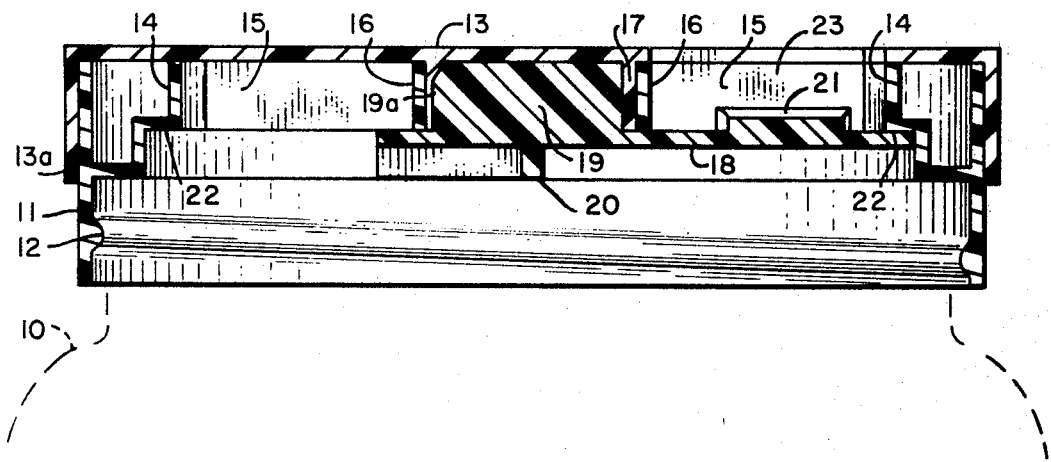
FIG. 2 is a sectional view taken along the line 2—2 of FIG. 1.

Referring to the drawing in detail, reference numeral 10 designates a jar or similar container, part of which is shown in FIGS. 1, 2 and 4. A substantially circular member 11, which may be made of plastic, metal or similar material, is provided with an internal thread 12 which is adapted to engage the thread of the jar so that this member may be fixedly attached to the top of the jar in place of the conventional cover.

A cover member 13, which is provided with a peripheral skirt 13a, is rotatably supported over the top of the member 11 so that the skirt 13a extends part way down around the outside of the member 11. The member 11 is provided with an internal annular member 14 to which the outer ends of the radially extending ribs 15 are attached. The inner ends of the ribs 15 are attached to the ring-shaped member 16. Thus, the ribs 15 form side walls of a plurality of compartments, formed in the member 11. The majority of these compartments are open on the bottom and may be filled with granular or pulverized material from the container 10 when the container is inverted.

A segmental member 18 is provided to this device. This segmental member provides a bottom to selected three adjacent compartments, that is, it covers three of the compartments so that the three compartments thus covered may not be filled with granular or pulverized material until the segmental member 18 is rotated out of the way. Of course, segmental member 18 may be made larger or smaller so it covers more or less than three compartments, if desired.

Segmental member 18 is provided with a projection 19 which extends into the ring-shaped member 17 provided to the under side and central part of the cover 13, as shown in FIG. 2. Projection 19 is provided with a key 19a that extends into the groove 17a formed in the ring-shaped member 17. The ring-shaped member 17 of the cover 13 extends into the ring 16 of member 11 and functions as a bearing for the cover when the cover 13 is assembled with member 11. The segmental member is assembled with the cover by inserting the projection 19 into the ring-shaped member 17 after the cover and member 11 are assembled. Care is taken to see that the wedge 21 which is formed in the upper side of member 18 is opposite the opening 23 in the cover. The projection 19 is keyed and cemented or otherwise attached to the ring-shaped member 17 so that the segmental member 18 is rotated when the cover 13 is turned with respect to the member 11.

The segmental member 18 is made of a length such that the outer circular peripheral portion thereof engages the shoulder 22 formed in member 14 which is attached to the inside of member 11, as shown in FIG. 2. Thus, when the cover 13 and member 18 are rotated, the peripheral portions of the latter member are swept around through the offset part 22 of member 14. A rib 20 is provided to the underside of the segmental member 18 to strengthen this member. This rib is integral with one of the edge portions of this segmental member and extends radially from the projection 19.

Rib 20 prevents the corresponding part of the segmental member 18 from being temporarily warped when the member 18 is rotated, and wedge 21 engages one of the ribs 15, that is, when granular or pulverant material is being dispensed from one of the compartments which is in the process of being aligned with the opening 23, as show in FIG. 4. A snap action is provided during the dispensing operation when the wedge 21 clears the rib 15 and the segmental member 18 is allowed to snap back to its normal position between ribs 15. The impact of this snap action jars loose any granular or pulverant material that may be caked or adhering in the compartment from which it is being dispensed. This snap action is particularly useful in jarring loose granular or pulverant material which is wettable and which may cake or adhere to surfaces of the compartment such as instant coffee, which is pulverized and sold in jars ready for use simply by dissolving the ground coffee in hot water. Wedge 21 also prevents rotation of the cover in the reverse direction since the high end of the wedge abuts the partition 15 adjacent thereto.

In the operation of this invention the cover 13 and segmental member 18 are rotated in the direction shown by the arrows in FIG. 4. Thus, the wedge 21 is brought from an empty compartment on the left to a filled compartment that is at the same time in the process of being aligned with the opening 23. When the wedge 21 is released into the aligned compartment, member 18 produces snap action that facilitates ejecting the contents of the aligned compartment through the opening 23. Also, at the same time the wedge 21 enters the compartment and fills part of the compartment. Thus, if desired, the wedge 21 may be made large enough so that it will fill a substantial part of the compartment and as a result press the contents of the compartment out of the opening 23 in addition to producing the aforesaid snap action for ejecting the contents.

While I have shown a preferred embodiment of this invention it will be apparent that the invention is capable of variation and modification from the form shown so that its scope should be limited only by the proper scope of the claims appended hereto.

What I claim is:

1. In a device for measuring and dispensing granulated or pulverized wettable material, said device being adapted for use as a cover for containers such as jars or the like, comprising a compartment member having means securely attaching it to the top of a jar containing the materials to be dispensed, said compartment member having means including walls defining a plurality of compartments, said compartments being open on the bottoms thereof so that they are adapted to be filled with the material to be dispensed when the container is inverted, a segmental member adapted to be positioned under said compartments in sequence, a cover positioned over said compartment member, means attached to said cover and to said segmental member holding said cover and said segmental member in assembled relation with said segmental member substantially aligned with an opening in said cover, said last mentioned means rotatably retaining said cover on the outside of said compartment member with the underside of said cover engaging the tops of said walls, said segmental member being adapted to be rotated when said cover is rotated in a predetermined direction, said segmental member having a solid wedge on the top surface thereof slidably engaging one of the walls of a selected compartment as said opening in said cover is being aligned with said selected compartment, said wedge is provided with a gradually inclined surface leading to the high end of the wedge which is adapted to abut a selected one of said extending walls of the selected compartment, said wedge causing said segmental member to be deformed during a part of the rotation thereof and allowing said segmental member to snap back to its normal position when said wedge is disengaged from said one wall and when said opening is aligned with said selected compartment whereby said segmental member snaps against the material in said selected compartment and said material is ejected therefrom through said opening.

2. In a device for measuring and dispensing granulated or pulverized wettable material, said device being adapted for use as a cover for containers such as jars or the like, as set forth in claim 1, further characterized in that said segmental member is provided with a leading edge and said wedge prevents rotation of said segmental member in other than said predetermined direction, said leading edge being provided with a radially extending reinforcing rib which prevents this part of said segmental member from being temporarily deformed when said segmental member is rotated and when said wedge engages a wall of said selected compartment.

References Cited
UNITED STATES PATENTS

| | | | |
|---|---|---|---|
| 509,320 | 11/1893 | Long | 222—452 |
| 928,052 | 7/1909 | Hirsch | 222—452 |
| 1,172,603 | 2/1916 | Johnson | 222—360 |
| 1,280,695 | 12/1916 | Takemi | 222—452 |
| 1,778,843 | 10/1930 | Brundhoff | 222—360 |
| 2,385,677 | 9/1945 | Bailey | 222—452 |
| 2,877,937 | 3/1959 | Weir | 222—452 |
| 3,055,559 | 9/1962 | Allison | 222—452 |
| 3,211,334 | 10/1965 | McShea | 222—452 |

WALTER SOBIN, *Primary Examiner.*

U.S. Cl. X.R.

222—452